United States Patent
Sherman

(10) Patent No.: US 10,289,614 B2
(45) Date of Patent: May 14, 2019

(54) DATABASE CODE-MODULE PERFORMANCE AND RELIABILITY METRICS INSTRUMENTATION

(71) Applicant: CenturyLink Intellectual Property LLC, Denver, CO (US)

(72) Inventor: Roby Sherman, Denver, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 587 days.

(21) Appl. No.: 15/010,234

(22) Filed: Jan. 29, 2016

(65) Prior Publication Data

US 2016/0232200 A1 Aug. 11, 2016

Related U.S. Application Data

(60) Provisional application No. 62/114,698, filed on Feb. 11, 2015.

(51) Int. Cl.
  *G06F 17/30* (2006.01)
  *G06F 16/23* (2019.01)
  *G06F 16/21* (2019.01)

(52) U.S. Cl.
  CPC ........ *G06F 16/2379* (2019.01); *G06F 16/217* (2019.01); *G06F 16/2365* (2019.01); *G06F 17/30306* (2013.01); *G06F 17/30377* (2013.01)

(58) Field of Classification Search
  CPC ......... G06F 17/30377; G06F 17/30371; G06F 17/30306; G06F 16/2379; G06F 16/217
  See application file for complete search history.

(56) References Cited

U.S. PATENT DOCUMENTS

| 7,194,664 B1 | 3/2007 | Fung et al. |
| 9,098,612 B2 | 8/2015 | Malkiman et al. |
| 9,244,749 B2 | 1/2016 | Malkiman et al. |
| 2007/0207800 A1 | 9/2007 | Daley et al. |
| 2008/0195369 A1 | 8/2008 | Duyanovich et al. |
| 2012/0174120 A1 | 7/2012 | Malkiman et al. |

(Continued)

OTHER PUBLICATIONS

T. Parsons, A. Mos and J. Murphy, "Non-instrusive end-to-end runtime path tracing for J2EE systems," Aug. 2006, The Institute of Engineering and Technology, IEE Proc.-Softw., vol. 153, No. 4, pp. 149-161, retrieved from http://ieeexplore.ieee.org/sta.

(Continued)

*Primary Examiner* — Cam Y T Truong
(74) *Attorney, Agent, or Firm* — Adsero IP

(57) ABSTRACT

Novel tools and techniques for instrumenting code-module execution within a database (or within a plurality of databases). In one aspect, various embodiments can instrument (e.g., measure and/or monitor) database applications, jobs, or other coded modules, execution steps, and/or any other type of executable code within (or even outside) of a database to accurately track execution and call lineage, timings, and/or errors within database code modules, long-running SQL statements, or other large database calls/callouts initiating from within one or more databases, across one or more platforms (e.g., Oracle, SQL Server, etc.). In another aspect, certain embodiments can perform such instrumentation through a variety of interfaces (intra-database calls, database links, linked servers, external application code, etc.).

30 Claims, 6 Drawing Sheets

(56) References Cited

U.S. PATENT DOCUMENTS

2015/0301876 A1    10/2015  Malkiman et al.
2017/0293649 A1*   10/2017  Finlay .............. G06F 17/30377

OTHER PUBLICATIONS

U.S. Appl. No. 13/073,504; Final Rejection dated Oct. 21, 2014; 40 pages.
U.S. Appl. No. 13/073,504; Issue Notification dated Jul. 15, 2015; 1 page.
U.S. Appl. No. 13/073,504; Non-Final Rejection dated Jun. 18, 2014; 40 pages.
U.S. Appl. No. 13/073,504; Notice of Allowance dated Mar. 25, 2015; 43 pages.
U.S. Appl. No. 14/747,228; Issue Notification dated Jan. 6, 2016; 1 page.
U.S. Appl. No. 14/747,228; Non-Final Rejection dated Aug. 5, 2015; 64 pages.
U.S. Appl. No. 14/747,228; Notice of Allowance dated Sep. 16, 2015; 47 pages.

* cited by examiner

DATABASE CODE-MODULE PERFORMANCE AND RELIABILITY METRICS INSTRUMENTATION

CROSS-REFERENCE TO RELATED APPLICATIONS

This non-provisional application claims the benefit, under 35 U.S.C. § 119(e), of provisional U.S. Pat. App. Ser. No. 62/114,698, filed Feb. 11, 2015 by Roby Sherman and titled "Database Code-Module Performance and Reliability Metrics Instrumentation", the entire disclosure of which is incorporated herein by reference for all purposes.

This application may also be related to U.S. patent application Ser. No. 14/747,228, filed Jun. 23, 2015 by Malkiman et al. and titled, "End-to-End Application Tracking Framework" (the "'228 Application,"), which is a continuation of U.S. patent application Ser. No. 13/073,504 (now U.S. Pat. No. 9,098,612), which claims the benefit of provisional U.S. Patent Application No. 61/428,709. All of the above applications/patents are incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Over the past several years, computer server functionality has become increasingly modular. The rise of transaction processing, web services, eXtensible Markup Language ("XML") interfaces, and similar technologies has resulted in a situation in which a lengthy execution chain involves one or more application servers, middleware servers, database servers, and/or the like, merely to service a single user request (e.g., an hypertext transfer protocol ("HTTP") GET request from a web browser, or the like).

This modularity, however, has greatly complicated the task of software instrumentation and performance monitoring. For example, in an execution chain involving several different application components, it can be difficult to monitor the performance (and/or even confirm the execution) of a particular application component to determine, for example, which component is introducing performance bottlenecks and/or preventing the execution chain from completing successfully.

There have been proposed several solutions to the problem of instrumenting such modular application chains. For example, the '228 application (already incorporated by reference) describes several existing solutions, and the issues inherent to such solutions. The '228 application also discloses a framework and techniques that provide the ability to track the performance and reliability of different components in an application chain. To date, however, such application instrumentation solutions have been unable to instrument processes that occur inside of a database. For example, the '228 application describes a technique of recording when a database is called, and recording when a return is received from the database, as a proxy for measuring the performance of the database itself.

More generally, existing database performance metrics gathering and tracing solutions can only track the number of times a top-level step/function/code module is called within the database and/or the overall duration of the call chain in a given session or job, but they cannot provide any granularity below this level to show individual performance metrics for each nested call within the same database; likewise, existing solutions cannot provide instrumentation for nested calls across links/gateways to other remote databases (whether on the same platform or not). Existing solutions also lack the ability to reliably map database sessions back to application/browser sessions except through relative server timestamps, which are highly unreliable, especially in multi-threaded and multi-server environments.

There remains a need, however, for a solution that can instrument database performance more granularly.

BRIEF SUMMARY

Certain embodiments provide for instrumenting code-module execution within a database (or within a plurality of databases). In one aspect, various embodiments can instrument (e.g., measure and/or monitor) database applications, jobs, or other coded modules, execution steps, and/or any other type of executable code within (or even outside) of a database to accurately track execution and call lineage, timings, and/or errors within database code modules, long-running SQL statements, or other large database calls/callouts initiating from within one or more databases, across one or more platforms (e.g., Oracle, SQL Server, etc.). In another aspect, certain embodiments can perform such instrumentation through a variety of interfaces (intra-database calls, database links, linked servers, external application code, etc.).

In a further aspect of certain embodiments, the framework can integrate with a larger application tracking framework, such as that disclosed in the '228 application, to name one example. As such, certain embodiments can accomplish database instrumentation (including, without limitation, as part of instrumenting an entire application execution chain) with a few simple database calls to an application programming interface that can interface with an instrumentation database and/or an application server. This can minimize overhead in the monitored databases and/or applications and the amount of coding required to implement the framework. Thus, in some cases, the framework provides for the passing of database traceability data in protocol-specific headers of existing inter-application (and/or intra-application) communication protocols, allowing the framework to be implemented without affecting application components that cannot accommodate the framework.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides a method for measuring database code-module performance and reliability. The method might comprise receiving, in a database management system, a call to a set of executable code within a database managed by the database management system, determining, in the database management system, that the set of executable code should be instrumented to measure performance of the set of executable code, and invoking, with an executing instance of the set of executable code in the database management system, the measurement function, based at least in part on a determination that the set of executable code should be instrumented. The method might also comprise collecting, with the measurement function, metric data about execution of the set of executable code, the metric data including a start time of the executing instance of the set of executable code, storing, with the measurement function, the metric data in a table in the database, and associating, in the database, a unique identifier with the executing instance of the set of executable code and the metric data. The method might further comprise returning, with the measurement function, an identifier string to the executing instance of the set of executable code, the identifier string corresponding to the unique identifier, passing, with the executing instance of the set of executable code, the identifier string to the measurement function at completion of execution of the set of executable code, and adding, with the measurement function, a stop time to the metric data in the database, based on receipt of the identifier string from the executing instance of the set of executable code.

In some embodiments, the metric data might be stored in a dedicated table in the database, the dedicated table being separate from any tables on which the executing instance of the set of executable code operates. The method might further comprise performing a roll-back operation in the database to revert transactions performed by the executing instance of the set of executable code. The metric data might persist in the dedicated table even after the roll-back operation has been performed.

According to some embodiments, the method might further comprise asynchronously pushing the metric data and associated unique identifier to a repository server for further analysis. In some cases, the method might further comprise analyzing the metric data and associated unique identifier in the repository server to identify an execution chain involving the executing instance of the set of executable code. In some instances, the execution chain might comprise executing instances of multiple sets of executable code, each set comprising different executable code. At least some of the multiple sets of executable code might execute outside of the database. According to some embodiments, the method might further comprise analyzing the execution chain to identify performance issues relating to execution of at least some of the multiple sets of executable code. In some embodiments, the method might further comprise asynchronously purging the metric data from the dedicated table. The metric data, in some cases, might be purged without regard to a success or failure in pushing the metric data to the repository server.

In some instances, the measurement function might employ autonomous transactions to store the metric data and stop time. The database management system, in some embodiments, does not support autonomous transactions, and, in some cases, the measurement function might simulate an autonomous transaction to store the metric data and stop time. Simulating an autonomous transaction, according to some embodiments, might comprise creating a loopback linked server, disabling remote transaction promotion in the loopback linked server, creating a stored procedure to store the metric data and stop time, and calling the stored procedure. In some cases, simulating an autonomous transaction might further comprise autonomously determining whether the database management system is in an auto-commit mode; if the database management system is in an auto-commit mode, calling the stored procedure without using the loopback linked server; and if the database management system is not in an auto-commit mode, calling the stored procedure over the loopback linked server. In some cases, autonomously determining whether the database management system is in an auto-commit mode might comprise determining whether implicit transactions are enabled in the database management system; determining whether a current transaction count in the database management system is greater than zero; and based on a determination that implicit transactions are not enabled and the current transaction count is not greater than zero, determining that the database management system is in an auto-commit mode.

Merely by way of example, in some cases, the set of executable code might be a first set of executable code, the metric data might be first metric data, the unique identifier might be a first unique identifier, and the identifier string might be a first identifier string. In such cases, the method might further comprise prior to initiating a callout to a second set of executable code, passing the unique identifier from the executing instance of the first set of executable code to the measurement function; creating, with the measurement function, a second unique identifier, the second unique identifier being associated with execution of the second set of executable code and with the first unique identifier; storing, with the measurement function, second metric data in the database; and associating, in the database, the second metric data with the second unique identifier. The method might further comprise returning, with the measurement function, a second identifier string to the executing instance of the first set of executable code, the second identifier string corresponding to the second unique identifier; upon completion of execution of the second set of executable code, passing, with the executing instance of the first set of executable code, the second identifier string to the measurement function; and storing, with the measurement function, a second stop time with the second metric data in the database, based on receipt of the second identifier string from the executing instance of the first set of executable code.

According to some embodiments, the method might further comprise initiating, with the executing instance of the first set of executable code, the callout to the second set of executable code; determining that the second set of executable code should be instrumented to measure performance of the second set of executable code; and invoking, with an executing instance of the second set of executable code, the measurement function, based at least in part on a determination that the second set of executable code should be instrumented. The method might further comprise collecting, with the measurement function, additional second metric data about execution of the second set of executable code; storing, with the measurement function, the additional second metric data in the database; and associating, in the database, the additional second metric data with the second unique identifier. In some cases, the second set of executable code might execute in a different database than the first set of executable code. Alternatively, the second set of executable code might execute outside of any database. In some instances, the first identifier string might comprise an execution chain identifier and the second identifier string might also comprise the execution chain identifier.

In some embodiments, the identifier string might comprise the unique identifier. Alternatively, or additionally, the identifier string might comprise application or browser session information. In some cases, the metric data might comprise performance timings. Alternatively, or additionally, the metric data might comprise execution parameters. Alternatively, or additionally, the metric data might comprise success or failure information. According to some embodiments, the executable code might comprise a database trigger. Alternatively, or additionally, the executable code might comprise a stored procedure or function. Alternatively, or additionally, the executable code might comprise a database job. Alternatively, or additionally, the executable code might comprise an external script. In some embodiments, the call to the set of executable code might comprise at least one parameter associated with the management function, and determining that the set of executable code should be instrumented might comprise parsing the at least one parameter.

In another aspect, an apparatus might be provided. The apparatus might comprise a non-transitory computer readable medium having encoded thereon a set of instructions executable by one or more computers to cause the apparatus to: receive, in a database management system, a call to a set of executable code within a database managed by the database management system; determine, in the database management system, that the set of executable code should be instrumented to measure performance of the set of executable code; invoke, with an executing instance of the set of executable code in the database management system, the measurement function, based at least in part a determination that the set of executable code should be instrumented; collect, with the measurement function, metric data about execution of the set of executable code, the metric data including a start time of the executing instance of the set of executable code; store, with the measurement function, the metric data in a table in the database; associate, in the database, a unique identifier with the executing instance of the set of executable code and the metric data; return, with the measurement function, an identifier string to the executing instance of the set of executable code, the identifier string corresponding to the unique identifier; pass, with the executing instance of the set of executable code, the identifier string to the measurement function at completion of execution of the set of executable code; and add, with the measurement function, a stop time to the metric data in the database, based on receipt of the identifier string from the executing instance of the set of executable code.

In yet another aspect a computer system might be provided. The computer system might comprise one or more processors and a non-transitory computer readable medium in communication with the one or more processors. The computer readable medium might have encoded thereon a set of instructions executable by the one or more processors to cause the computer system to: receive, in a database management system, a call to a set of executable code within a database managed by the database management system; determine, in the database management system, that the set of executable code should be instrumented to measure performance of the set of executable code; invoke, with an executing instance of the set of executable code in the database management system, the measurement function, based at least in part a determination that the set of executable code should be instrumented; collect, with the measurement function, metric data about execution of the set of executable code, the metric data including a start time of the executing instance of the set of executable code; store, with the measurement function, the metric data in a table in the database; associate, in the database, a unique identifier with the executing instance of the set of executable code and the metric data; return, with the measurement function, an identifier string to the executing instance of the set of executable code, the identifier string corresponding to the unique identifier; pass, with the executing instance of the set of executable code, the identifier string to the measurement function at completion of execution of the set of executable code; and add, with the measurement function, a stop time to the metric data in the database, based on receipt of the identifier string from the executing instance of the set of executable code.

As noted above, other embodiments provide apparatus and/or computer systems. An exemplary apparatus might comprise one or more non-transitory computer readable storage media having encoded thereon one or more sets of instructions executable by one or more computers (e.g., a first set of instructions executable by a first computer and a second set of instructions executable by a second computer) to perform one or more operations.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
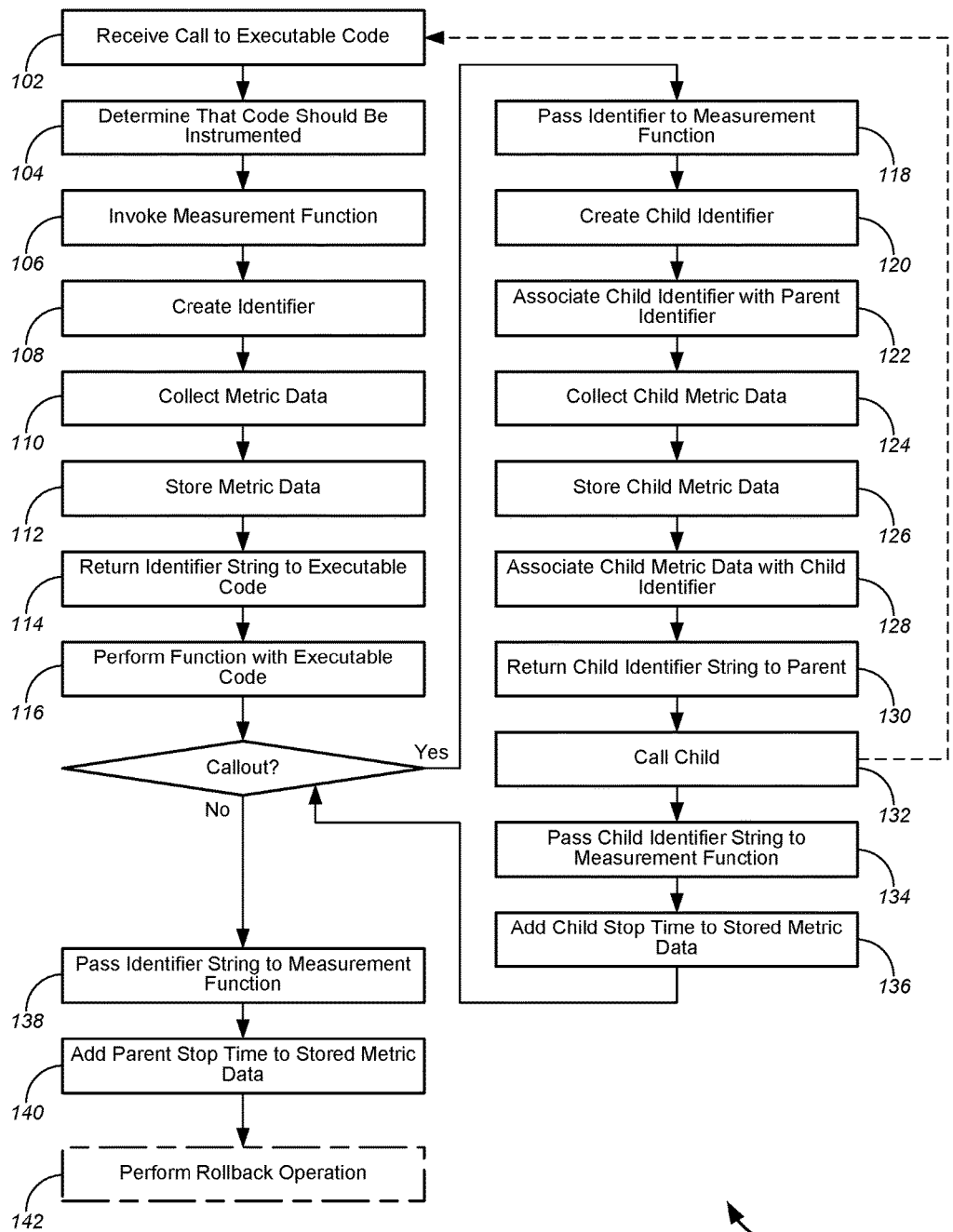
FIG. 1 is a process flow diagram illustrating a method for instrumenting and/or tracking code-module execution within a database(s), in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Database Code-Module Instrumentation

One set of embodiments provides techniques for instrumenting databases, including, without limitation, databases that are employed as part of a larger application execution chain. In one aspect, any set of executable code in a database (or, in some cases, even outside a database) can be instrumented by certain embodiments to measure performance and/or reliability of the executing or executable code. As used herein, a "set of executable code" can include, without limitation, database triggers, stored procedures/functions, code packages, jobs, external scripts, other database-centric code inside or outside the database, or any other type of code that can be executed within, or against, a database in a database management system (such as a relational database management system or "RDBMS"). Such executable code (sometimes referred to herein as a "database routine") can be instrumented with application programming interfaces ("APIs") that implement various embodiments.

In one aspect, the instrumentation can be implemented by adding one or more optional arguments to the routine's existing inbound parameters. In some cases, the parameters are kept optional so as to not interfere and remain fully compatible with other calling code modules that are not yet instrumented. This allows for gradual instrumentation of an entire database application over time without breaking the existing functionality.

When an instrumented routine is first invoked, it might call the instrumentation APIs at one or more points, causing the instrumentation framework to collect small fragments of metric and other diagnostic data. As an example, in the various embodiments, the instrumentation framework might collect start times (e.g., in Universal Time Coordinated ("UTC")), performance timings, execution parameters, success/failure information, etc. All metric data pertinent to the instrumented database might be saved to an internal table within that database.

In some embodiments, the framework might also internally generate universally unique identifiers ("UUIDs") and/or use this data along with any available session or job identifiers to track which instrumented routines are being executed and the relationships to other instrumented subroutines in its execution chain, whether those subroutines exist in the same database, a remote database on the same relational database management system ("RDBMS") platform, or a remote database on a different RDBMS platform.

Once the metric data and identifiers have been independently written, the framework might return a unique identifier to the instrumented routine. This identifier contains information about the UUID values, session information, and/or the like. This special unique identifier (which is referred to herein as a Reach identifier ("RID"), and which can be considered a type of "identifier string," as that term is used herein) can be used further by the instrumented subroutine in several ways, as described below.

For example, if or when the instrumented routine is about to make a specific callout to another subroutine (instrumented or not), the instrumented routine passes its RID to the APIs as a parent identifier. The APIs might then create a new child RID, collect start times, etc., and associate the child RID with the parent RID. The child RID is then returned to the calling instrumented routine.

As another example, if or when the instrumented routine calls another instrumented subroutine, the instrumented routine passes along the child RID, so that the child RID can be used by the subroutine when calling the framework's APIs (and the framework's code can associate the call back to the parent routine), or the instrumented routine passes the child RID on to additional instrumented subroutines, and/or the like.

Then, when the called subroutine completes its work and releases control to the parent or calling routine, the parent passes the child's RID back to the framework's APIs, along with success/failure information and any necessary diagnostic codes, so this data (along with the stop time in UTC) can be captured and associated with the child's start record. When the instrumented routine completes its own execution, the instrumented routine passes its RID back to the framework's APIs, along with success/failure information and any necessary diagnostic codes, so this data (along with the stop time in UTC) can be captured and associated with the start record.

In another aspect, all of the framework's metric data can be stored via completely-independent (and in some cases, autonomous) transactions within each database engine using the APIs to ensure that the metric data is not lost if a given instrumented database routine is required to perform a rollback operation. On database platforms where autonomous transactions exist (e.g., Oracle-based systems or the like), the framework can take advantage of this existing capability. On database platforms where autonomous transactions do not exist (e.g., SQL Server systems or the like), the platform-specific implementation of the framework can use a special combination of techniques to approximate the same functionality where possible. In the case of an SQL Server or the like, for example, an existing technique for simulating autonomous transactions can be extended to determine database transaction state at the time the API's are called, allowing more efficient input/output ("I/O") paths to be used, where possible, when writing out the metric data.

In certain embodiments, once the metric data is collected, it is periodically (and/or asynchronously) pushed to a repository server for further analysis and reporting, e.g., via a database job or an external job and a Java-based agent, etc. In another aspect, regardless of the run or failure state of this job (or the APIs writing the metric data), a third asynchronous process can run independently to ensure that "expired" data (processed or not) is purged, keeping the metric data footprint small on the database itself.

Application Tracking Framework

As noted above, certain embodiments can be employed in conjunction with, or within the context of, a larger application tracking framework, which might be used to instrument applications that employ components outside of the database context, such as web servers, application servers, and the like. An example of on such application tracking framework is described in the '228 application, already incorporated herein by reference. Thus, for example, the tools and techniques described herein with regard to database instrumentation can be used to provide such metrics to an application tracking application, which can integrate such metrics with other metrics gathered from the instrumentation of other application components.

As such, various embodiments might employ a data structure that is compatible with the data structures employed by an application tracking framework, although some conversion between the database instrumentation data format and the application tracking data format may be necessary in certain cases. Merely by way of example, as described in the '228 application, an application tracking framework, which operates outside the context of a database (at least in the instrumentation phase, if not the data storage phase) might employ a data object, with different instrumentation variables as properties of that object, while a database instrumentation tool, operating within the context of a database, might store similar data in a database record.

Nonetheless, in some cases, the database record format and/or data object format might be developed in such a way that translation from one to the other can be performed with relatively little computational expense. For example, the fields in a database record might be directly translatable into properties in a corresponding data object for an application tracking framework, such that a data object for use in the framework can be readily constructed from the database record. Of course, depending on the implementation, the fields in the database record for the database instrumentation API might be a subset, or a superset, of the properties in the data object for the application tracking framework.

An exemplary application tracking framework, which can supply complete, near-real-time complete traces of operation and performance status of applications and application components in production and other environments, is described in the '228 application. The framework allows hierarchical end-to-end tracking of application component (and application component layer) interactions and performance, and tracking of end user activities for web based and non-web based applications for both synchronous and asynchronous interactions. That framework, however, cannot instrument databases directly, and must depend on the timings of callouts from other components to indirectly infer the performance of any database components in the application chain. Certain embodiments, as described herein, can provide that missing data, to enable an application tracking framework to include direct measurements of database performance.

In one embodiment, the tracking framework is implemented as one or more centralized tracking databases, which may be operated by one or more centralized tracking servers, and a set of APIs that are accessible by application components to generate data according to the tracking framework. In a particular embodiment, for example, these APIs may be used by Java and .NET based applications on each computer where a monitored application component executes.

The terms "application," "application component," and "application component layer" are used interchangeably herein to refer to any discrete software entity that can be employed to perform a desired function. Within the context of this document, an application component can include one or more sets of executable code within one or more databases (referred to as "database code-modules") as well, which can be instrumented as described herein, and such instrumentation data can be integrated with other framework data obtained through tracking other application components. (An "application layer" refers to a specific case of an application component, in which distinct scopes of a single application component exchange data with each other via API calls, much like different application components exchange data using the same API calls, as described in further detail below.) For example, in many cases, a first application component will call a second application component to perform a specific processing function, and the second application component will return a result of that processing to the first application component. In this example, the first and second application components might be components of a single larger application, or they might be separate applications entirely (or components therefore) perhaps executing on different computer systems separated by any distance and communicating, e.g., over the Internet or an intranet. This calling procedure may be performed iteratively, either in series and/or in parallel, as a first application component calls a second application component, which calls a third application component, and so forth. In some cases, one application component might call two other components, again either serially or in parallel. The entire process, including each successive call and return, is referred to herein as an "execution chain," which normally begins with the invocation of a top level component and a return, by that top level component, of a result to the calling entity, which might be a user, a web browser, another application outside the execution chain, etc. The phrase "outside the execution chain" is used herein to refer to an entity that is not subject to the application tracking techniques described herein.

In many cases a first application component will call a second application component by sending a message in a specified format to the second application component. Any of a variety of message formats are possible, including without limitation Hypertext Transfer Protocol ("HTTP") messages, Simple Object Access Protocol ("SOAP") messages or other web-services based messages, eXtensible Markup Language ("XML") messages (including, without limitation, Information Bus XML messages), are but a few examples of such messages in which the execution tracking techniques of various embodiments may be employed. Within the database context, structured query language ("SQL") calls, calls to stored procedures or functions, database jobs, or even calls to external scripts, can be used to call various application components. In other cases, one application component (or application component layer) may call another application component (or application component layer, perhaps within the same application component) through the use of an application programming interface ("API"), and the execution tracking techniques of various embodiments may be used to trace such execution chains as well, although the use of a dedicated API may obviate the need for some of the features provided by various embodiments.

In some embodiments, applications are tracked by tracing "requests" and "callouts," and/or by creating database records to track these entities. As used herein, the term "request" refers to a message or data accepted by an application component, the message or data requesting the receiving application component to perform a processing function (the result of which might be returned as a response to the request). An outgoing message or data passed by a calling application component to a called application component is referred to herein as a "callout." Thus, there is generally a reciprocal relationship between a callout and a request—a single message between a calling application component and a called application component is considered a callout from the perspective of the calling application and is considered a request from the perspective of the called application. An exception to this relationship is the request received by the first application component in the execution chain, which generally will not have a corresponding callout from a calling application component (since whatever entity called the first application will generally be outside the execution chain and/or may not be instrumented with the framework described herein). Application components may have from zero to many callouts for a given request; conversely, application components may have from one to many requests for a given callout, although there usually may be only one request for a given callout.

Certain embodiments create and/or modify records to track the execution of application components in the execution chain. These records can serve multiple purposes. For example, in some cases, the records can memorialize the execution chain (i.e., can demonstrate that a first application called a second application) if the execution chain is not completed, which can assist in troubleshooting a complex execution chain. Moreover, the records, as described in more detail below, can be used to monitor performance of the execution chain as a whole and/or of components involved in the execution chain.

There are two basic types of records employed by certain embodiments: a begin record and an end record. A begin "request" record is generated by an application component immediately upon receiving a request (in particular embodiments, before any other processing is performed responsive to that request), or immediately before calling another component. An end "request" record is generated by the application component after completing execution to respond to the request message/data (usually before transmitting any response to the calling entity). Likewise, a begin "callout" record may be generated immediately before submitting a callout to a called application component, and an end "callout" record may be generated immediately after receiving the response to that callout. In an embodiment, an application component generates a record (which might be either a begin record or an end record for a request or a callout) using an API call to the tracking server.

In an embodiment, an application generates a record by making an API call to the tracking framework, which creates a record object. The API then may transmit the object (perhaps as a delimited string, such as a comma-delimited string) to a tracking server, which may store the record as a database record, perhaps in the conventional fashion. In one aspect, an application calls the API to generate a begin record immediately after receiving a request (or immediately before sending a callout) and calls the API. Although a variety of record formats (and formatting conventions) are possible within the scope of different embodiments, the table below illustrates a record format for each type of record, in accordance with one set of embodiments:

TABLE 1

Example Layout for Begin Record

| N | Field Name | Value Type | Value | Nullable/ Empty | Max Length |
|---|---|---|---|---|---|
| 1 | Label | String | B - Setup by framework. | N | 1 |
| 2 | Hostname | String | Determined by framework | N | 64 |
| 3 | Application Server Name | String | Passed as a parameter to framework. | N | 48 |
| 4 | Record Id | GUID - string | Generated by framework | N | 36 |
| 5 | Parent Id | GUID - string | Set up by framework. Value is empty for initial requests. | Y | 36 |
| 6 | Correlation Id | GUID - string | Set up by framework | N | 36 |
| 7 | Record Type | String | Set up by framework. R—request; C—callout; S—service | N | 1 |
| 8 | Application Id | String | Implementation-specific identifier | N | 40 |
| 9 | Service Name | String | Passed by application component as a parameter to API. | N | 64 |
| 10 | Function Label | String | Passed by application component as a parameter to API. Identifies processing function within component | N | 64 |
| 11 | UI Session Id | String | Passed by web apps as a parameter to API or set up by framework. | Y | 128 |
| 12 | Sample Frequency | Integer | Passed by application component as a parameter to API. | N | 1-6 |
| 13 | Start Time | String | Set up by framework API. | N | 23 |

TABLE 1-continued

Example Layout for Begin Record

| N | Field Name | Value Type | Value | Nullable/ Empty | Max Length |
|---|---|---|---|---|---|
| 14 | Stop Time | String | Set up by framework API. Empty string at creation of begin record. | Y | 23 |
| 15 | Duration | Integer | Set up by framework API. Empty string at creation of begin record. | Y | 1-5 |
| 16 | Completion Status | String | Set up by framework API. Empty string at creation of begin record. | Y | 1 |
| 17 | Start Info | String | Can be set up by framework API | Y | 255 |
| 18 | Supplemental Info | String | Can be set up by framework API. | Y | 255 |

As noted above, the layout for the begin record (and the fields therein) can vary in different embodiments, but for exemplary purposes, this layout is used in several embodiments. In this example, the Label field identifies the record as a Begin record. The Hostname field identifies the host on which the application component executes, and can be determined by the framework (e.g., through conventional operating system calls). The Application Server Name field can be implementation specific, and it can identify a particular specific named server process on a given host (e.g., one of several web application servers, such as WebSphere™, Apache™, and/or the like, some or all of which might be running on a given host).

The Record ID field is generated by the framework, and it is a (e.g., globally) unique identifier of the record. This field, as described elsewhere herein, is used in many embodiments to track an execution chain from request to callout to request, and so forth. For example, the Parent ID field (which also can be a globally unique identifier), which is also assigned by the framework, is blank for the first request in an execution chain, but that field will be populated with the Record ID value for the preceding step(s) in the execution chain. The Correlation ID field is similar (and can also be globally unique), but it is populated with the same value for each record in an execution chain (which might be, in some cases, the Record ID of the first record in the execution chain). The UI Session ID is used in web-based applications, and in some embodiments, that field corresponds to the UI Session ID established between a user's web browser and the web server (or web application) that initiated the execution chain. The UI Session ID field thus can allow all of the records in two or more different execution chains to be correlated with a particular end user's browser session. For non-browser-based applications, this field might be left null or omitted altogether.

The Record Type field identifies the type of framework-specific transaction to which the record corresponds—e.g., a request, a callout, etc. The Application ID is implementation-specific, and may be omitted from some embodiments, but if an enterprise uses an applications catalog to register applications components, the Application ID can be used to store the applications catalog's identifier for the application component to which the record relates. This field might be set by the framework, based on a lookup in the applications catalog, or might be passed by the component itself to the API. Other options are possible as well.

Similarly, the Service Name field can be used, based on the implementation, to provide a human-friendly logical name for the application component, and the Function Label can be used to provide a human-friendly logical name for the function within the component that is responsible for processing the request, or that issued the callout, depending on the nature of the record.

The Sample Frequency is an optional field that is used, in some embodiments, to notify the framework of the sample frequency that should be used to monitor that application component's performance. The Sample Frequency might depend on the volume of transactions processed by that application component. For example, for relatively low transaction volume processes, the sample frequency might be "1," meaning that every transaction should be tracked. For high-volume processes, such frequent sampling might create performance problems, so a lower sample frequency, such as sampling one of every 10,000 transactions, might be more efficient. The application component can pass the desired sample frequency to the API as a parameter.

The exemplary record depicted in Table 1 also includes a Start Time field, which can be a Universal Time Coordinated ("UTC") date-time value, among other alternatives. In some embodiments, the framework obtains the current time at the host where the application component executes (e.g., from the host's system clock, etc.) and populates this field with that value, although other alternatives are possible as well. In an aspect, the Start Time field can represent the current time (to an appropriate or available degree of precision) immediately after the request is received or immediately before the callout is made, depending on the nature of the record. The record may also include a Stop Time field and a Duration field. Generally, in a begin record, each of these fields is null. Similarly, the Completion Status field, which can be used to indicate any execution problems, is left empty in a begin record.

An optional Start Info field can be populated by a framework-specific API to store values of function business parameters, which can allow correlation between actual business data and framework-specific load and/or performance data characterizing the processing of that business data. There may also be a Supplemental Info field to hold execution information about the process to which the request or callout relates; this field is generally null in a begin record.

In certain embodiments, an end record has the same (or similar) layout as a begin record. The difference between the two is that an end record generally will also include information that is available only after execution (either of request processing or of a called process) is complete. In some embodiments, in fact, the object that represents the begin record, as created by the framework API, persists until processing of the request/callout is complete, at which point the object is updated by another API call to populate the object with values which become available after processing, such as stop time, duration, status, and supplemental information; this updated object can then be transmitted to the tracking server for storage as an end record.

begin record might be deleted when the end record is received. In other cases, the appropriate fields of the begin record might be updated with values from the end record, while in still other cases, the begin record and the end record might be stored as different records. (In an aspect of some embodiments, if a begin record exists without a correspond-

TABLE 2

Example Layout for End Record

| N | Field Name | Value Type | Value | Nullable/ Empty | Max Length |
|---|---|---|---|---|---|
| 1 | Label | String | E | N | 1 |
| 2 | Hostname | String | Determined by framework | N | 64 |
| 3 | Application Server Name | String | Passed as a parameter to framework. | N | 48 |
| 4 | Record Id | GUID - string | Generated by framework | N | 36 |
| 5 | Parent Id | GUID - string | Set up by framework. Value is empty for initial requests. | Y | 36 |
| 6 | Correlation Id | GUID - string | Set up by framework | N | 36 |
| 7 | Record Type | String | Set up by framework. R—request; C—callout; S—service | N | 1 |
| 8 | Application Id | String | Implementation-specific identifier | N | 40 |
| 9 | Service Name | String | Passed by application component as a parameter to API. | N | 64 |
| 10 | Function Label | String | Passed by application component as a parameter to API. Identifies processing function within component | N | 64 |
| 11 | UI Session Id | String | GUID. Passed by web apps as a parameter to API. | Y | 128 |
| 12 | Sample Frequency | Integer | Passed by application component as a parameter to API. | N | 1-6 |
| 13 | Start Time | String | Determined by framework | N | 23 |
| 14 | Stop Time | String | Determined by framework | Y | 23 |
| 15 | Duration | Integer | Determined by framework | Y | 1-5 |
| 16 | Completion Status | String | Passed by application component as parameter to API | Y | 1 |
| 17 | Start Info | String | As was set by API | Y | 255 |
| 18 | Supplemental Info | String | Passed by application component as parameter to API | Y | 255 |

As can be seen by a comparison of Tables 1 and 2, in the exemplary embodiment, the record format for begin and end records is essentially the same (although this is not required), and in some cases, generating an end record, as mentioned above, may merely comprise calling the framework API to update the record object with information available after processing has completed, although there may be two discrete records transmitted to the tracking server and/or stored in the tracking database for each record object—a begin record and an end record.

Thus, for example, the exemplary end record has a different value ("E") for the Label field, indicating that the record is an end record, rather than a start record. The End Record also has values for the Stop Time field and the Duration field (which might simply be an arithmetic subtraction of the start time from the stop time). The end record may also have a value for the Completion Status field (which may be a parameter passed by the application component to the API for error handling purposes) and/or the Supplemental Info field (which may be a parameter passed by the application component to the API to provide any transaction-specific information, which can be shared among application components and/or stored in the tracking database).

How the respective begin and end records are stored in the database is implementation-specific. In some cases, the ing end record, or if a begin record has not been updated with data from an end record, that inconsistency can be used to identify processes that did not successfully complete execution.)

As can be seen from the examples above, an execution chain can be considered hierarchical in nature, with an application component hierarchy existing from requests to callouts and from callouts to requests. For example, upon receiving an initial request (from outside the execution chain) an application component will call the tracking server (e.g., as a call to a tracking framework API on the machine on which the application component executes) to generate a begin record for the request (referred to herein as a "Request Record").

If the first application component needs to call a second application component, the first application component will call the tracking server again to store a begin record for the callout (referred to herein as a "Callout Record"). When calling the tracking server to store a Callout Record, the application component will often pass, as a parameter of the call, the Record ID of the Request Record. (Alternatively, if the respective calls to the tracking server to store the Request Record and the Callout Record are made as part of the same execution thread at the machine on which the application component runs, the Record ID of the Request Record may be maintained in the machine's thread store, which can be accessed by the API, and therefore need not be passed as part of the call by the application component.) The API, then, will generate the Callout Record with a start time of the callout (which, again, might be a UTC value but might be obtained locally at application component). The API will also assign, as both the Correlation ID and the Parent ID in the Callout Record, the Record ID of the Request Record. In this way, the Callout Record is linked to the Request Record, and it can be considered a child of the Request Record. The record type of the Callout Record will be "C".

Upon receiving the call from the first application component, the second application component, from whose perspective the call is a request, will call a messaging platform-specific API to generate a second Request Record. The Record ID of the Callout Record may be passed as part of the call, and that Record ID of the Callout Record will be assigned as the Parent ID of this new Request Record. The Correlation ID and/or UI Session ID will be the same. Accordingly, this new Request Record will be identified as a child of the Callout Record and as part of the same execution chain as both the first Request Record and the Callout record. This new Request Record will be assigned a start time corresponding to the time the request was received at the second application component. This process can be repeated consecutively for each callout in the execution chain, e.g., if the second application component needs to call a third application component, it will call the API to generate a new callout record, the third application component will call the API to generate a new request record, and so forth.

When an application component finishes processing the request, it will call the API to generate an end record for that request. As noted above, in some embodiments, the end record will essentially be identical to the corresponding begin record for the request, except that it will include a stop time. The end record may also include some execution related-data (such as exception handling data, etc.). Similarly, when a calling application component receives a result from a called application component, the calling application component will call the API to generate an end record for the callout, generally immediately after receiving the response from the called application.

In operation, the Parent ID value allows for end-to-end traceability of data/messages flow from component to component. The UI Session ID value allows for tracing of end user activities in web based applications. Its value will be the same across framework records associated with different hierarchical chains for different initial requests within the same user session. Similarly, the Correlation ID value allows for tracing of end user activities in non-web based applications. Its value will be the same across framework records associated with different hierarchical chains for different initial requests within the same instance of application execution.

Generated request and callout records thus can be collected and processed to compute the request and callout durations and establish a trace of execution from request to callout in the calling application and from the callout in the calling application to the request in called application. Since the called application often plays dual roles and calls another application use of this framework allows us to establish end-to-end trace of execution in diverse and complex interaction patterns.

The framework allows for reliable load metrics collection. Each begin request and callout record accounts for one data/message to be processed by application/application component. In cases when the framework is not fully implemented and end records are not logged, collection of begin records still allows for load measurement. Further, the framework can provide a light weight approach for performance metrics collection. Duration of requests and callouts can be computed outside of application or application components by processing start and stop records with the same Record ID.

For example, comparison of a request start time and a corresponding (child) callout start time can be used to measure load of an application receiving the request and issuing the callout, while comparison of a callout start time and a corresponding (child) request start time can be used to measure communication responsiveness (and/or network latency, etc.) between a calling application and a called application. Similar metrics can be developed for called application performance (difference between start time and stop time) and/or the like.

Inter-Application Communication and Reporting

Other embodiments can provide a light-weight, non-intrusive approach for passing traceability and auxiliary data from a calling application or application component to a called application or application component to enable metrics data generation according to framework described above.

In an aspect, certain embodiments utilize existing auxiliary facilities (including, but not limited to, protocol headers) for sending status and/or timing information between applications (e.g., on behalf of the tracing framework described above). Such an implementation reduces the total impact on the operation of the applications and application components. Thus, while the business data and/or messages (collectively referred to herein as "application data") may be sent as payload between application components, the auxiliary facilities associated with the mode of inter-component communication can be used to pass traceability and auxiliary data.

For example, the header of the SOAP protocol may be used to store tracking information. Such information may include a correlation ID, record ID, parent ID, etc. Because such embodiments use the SOAP (or other existing) protocol, there is no need to change the schema or payload of applications, and so there is very little impact on operations of the applications. The implementation of such a tracking framework also becomes very transparent because no new or additional protocols are needed to implement such functionality. Furthermore, because the framework uses existing protocol headers to transport information, the overall impact on the operation of the applications is minimal.

Thus, the approach employed by various embodiments involves passing of traceability data, such as the Parent ID, UI Session ID, Correlation ID described above (and/or auxiliary data) without requiring any change to business application programming interfaces.

The traceability data and auxiliary data may be passed from calling application or application component to called application or application component by means of different protocols infrastructure and data exchange. The examples include, but are not limited to: HTTP headers for HttpRequest to called application, SOAP headers for calls to web services, JMS headers for JMS calls, Bus headers for calls to Information Bus responders, HTTP Request parameters, a data set placed on a queue, and/or the like.

Specific Exemplary Embodiments

Figure 6:
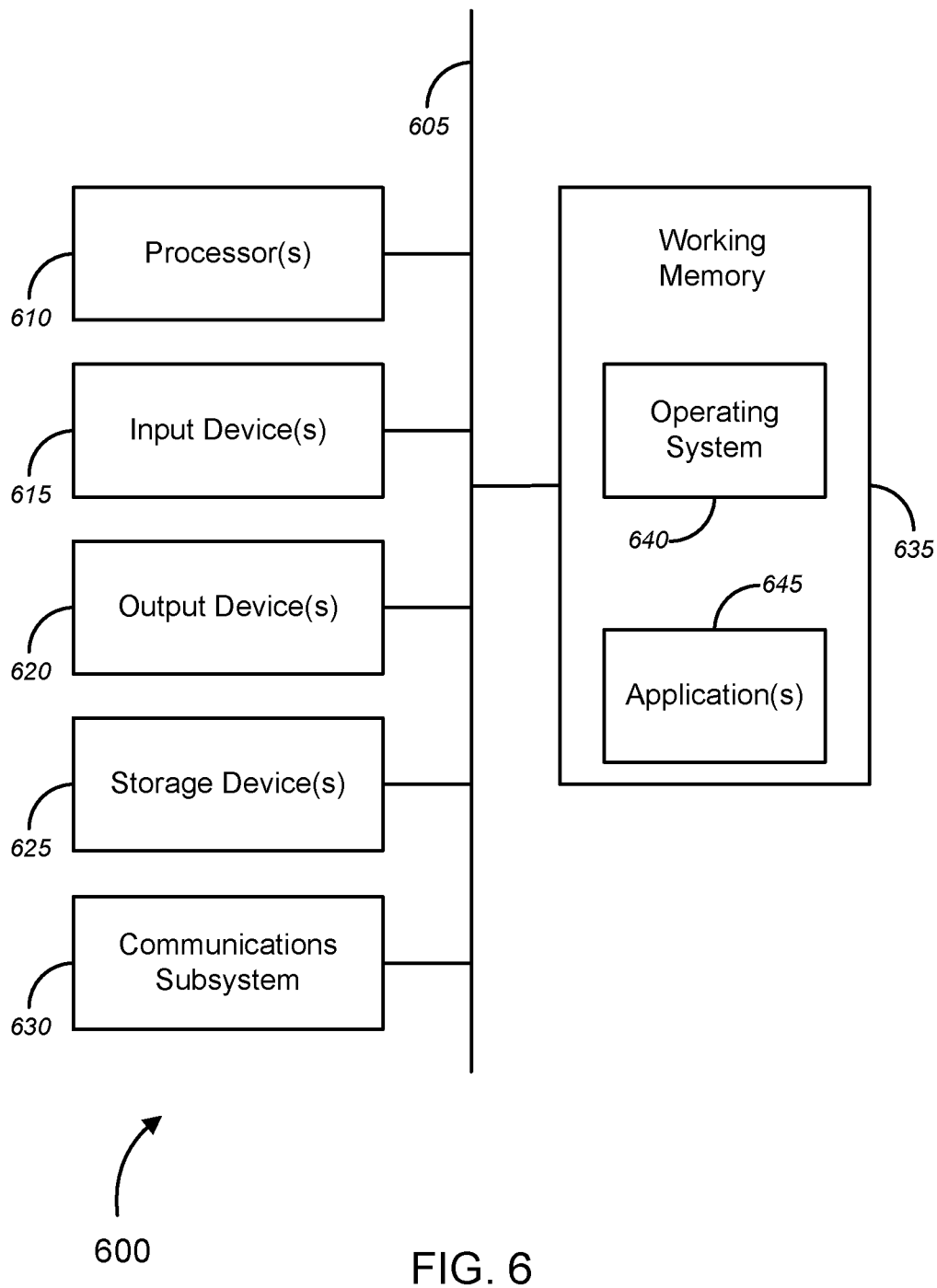
FIG. 6 is a generalized schematic diagram illustrating a computer system, in accordance with various embodiments.
Figure 7:
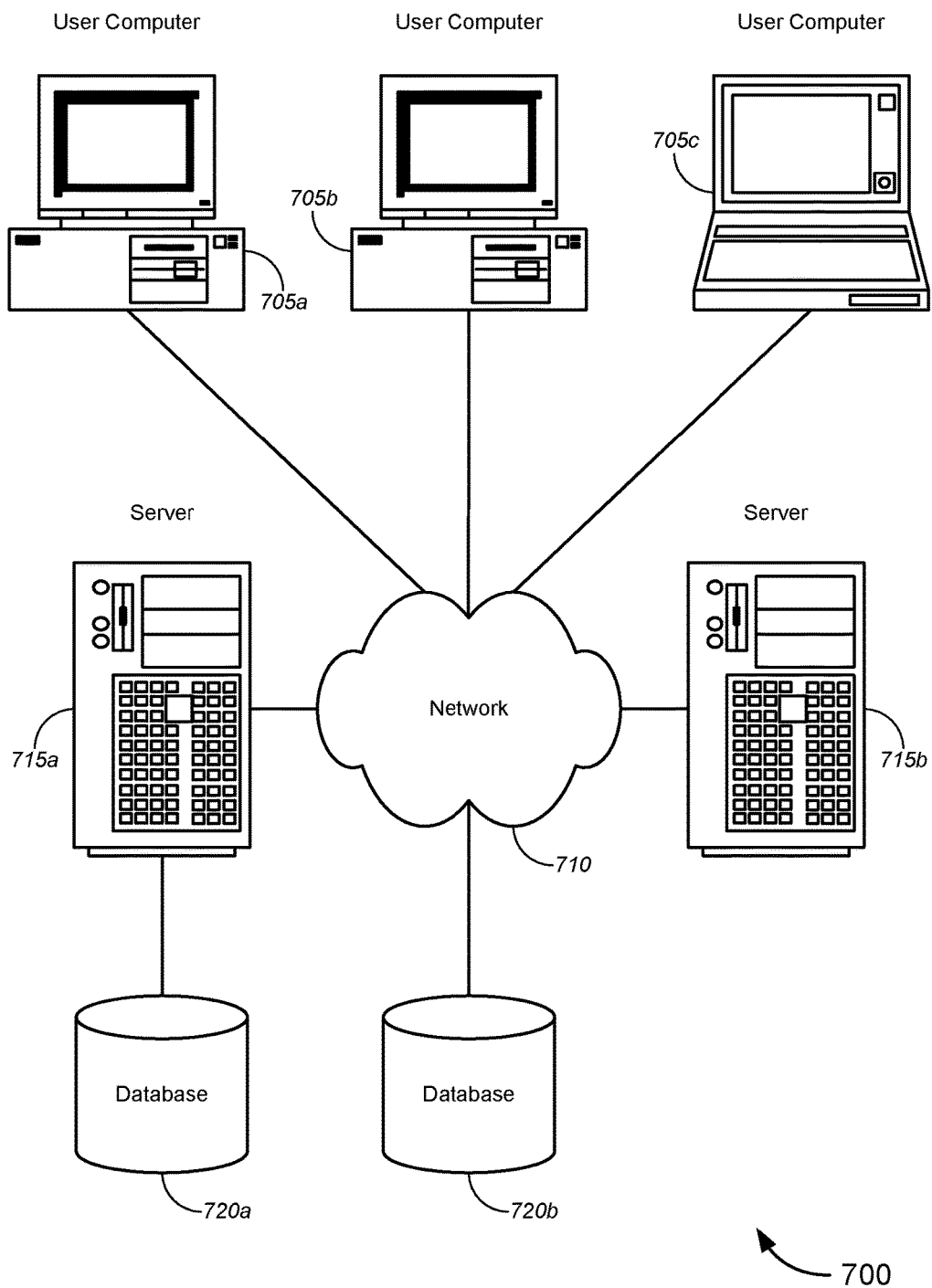
FIG. 7 is a block diagram illustrating a networked system of computers, which can be used in accordance with various embodiments.

We now turn to the embodiments as illustrated by the drawings. FIGS. 1-7 illustrate several exemplary embodiments, and it should be noted that the features of the embodiments in conjunction with FIGS. 1-7 can be combined in any suitable fashion without varying from the scope of yet other embodiments. In particular, FIGS. 1-5 illustrate various methods that can be used to monitor and/or track database performance, particularly as part of an application execution chain, while FIGS. 6 and 7 illustrate exemplary hardware implementations that can be used to perform such methods. The description of the illustrated methods, systems, and apparatuses shown in FIGS. 1-7 is provided for purposes of illustration and should not be considered to limit the scope of the different embodiments.

While the methods of FIGS. 1-5 are illustrated, for ease of description, as different methods, it should be appreciated that the various techniques and procedures of these methods can be combined in any suitable fashion, and that, in some embodiments, the methods depicted by FIGS. 1-5 can be considered interoperable and/or as portions of a single method. Similarly, while the techniques and procedures are depicted and/or described in a certain order in each of FIGS. 1-5 for purposes of illustration, it should be appreciated that certain procedures may be reordered and/or omitted within the scope of various embodiments. Moreover, while the methods illustrated by FIGS. 1-5 can be implemented by (and, in some cases, are described below with respect to) the systems 600 and 700 of FIGS. 6 and 7 below, these methods may also be implemented using any suitable hardware implementation or application framework. Similarly, while the systems described herein can operate according to the methods illustrated by FIGS. 1-5 (e.g., by executing instructions embodied on a computer readable medium), the systems can also operate according to other modes of operation and/or perform other suitable procedures.

With reference to the figures, FIG. 1 is a process flow diagram illustrating a method 100 for instrumenting and/or tracking code-module execution within a database(s), in accordance with various embodiments.

In the embodiment of FIG. 1, method 100 might comprise, at block 102, receiving, in a database management system ("DBMS"), a call to a set of executable code within a database managed by the DBMS. In some embodiments, the executable code might comprise at least one of a database trigger, a stored procedure or function, a database job, an external script, and/or the like. At block 104, method 100 might comprise determining, in the database management system, that the set of executable code should be instrumented to measure performance of the set of executable code. In some cases, the call to the set of executable code might comprise at least one parameter associated with the management function, and determining that the set of executable code should be instrumented might comprise parsing the at least one parameter.

Method 100, at block 106, might comprise invoking, with an executing instance of the set of executable code in the database management system, the measurement function, based at least in part on a determination that the set of executable code should be instrumented. Method 100 might comprise creating an identifier (also referred to herein as a "parent identifier") (block 108), collecting, with the measurement function, metric data about execution of the set of executable code (block 110), and storing, with the measurement function, the metric data in a table in the database (block 112). The metric data, in some cases, might include a start time of the executing instance of the set of executable code. In some instances, the metric data might comprise performance timings (other than or in addition to the start time of the executing instance of the set of executable code).

Alternatively, or additionally, the metric data might comprise execution parameters. In other alternative or additional embodiments, the metric data might comprise success or failure information. In some embodiments, the metric data is stored in a dedicated table in the database, the dedicated table being separate from any tables on which the executing instance of the set of executable code operates. Merely by way of example, in some cases, method 100 might comprise performing a roll-back operation in the database to revert transactions performed by the executing instance of the set of executable code (not shown in FIG. 1), and the metric data persists in the dedicated table even after the roll-back operation has been performed.

Method 100 might further comprise returning, with the measurement function, an identifier string to the executing instance of the set of executable code (block 114) and performing one or more functions with the set of executable code (block 116). The identifier string might correspond, in some cases, to the unique identifier. In some embodiments, the identifier string might comprise the unique identifier. Alternatively, or additionally, the identifier string might comprise application or browser session information.

Based on a determination that a callout is to be made, the set of executable code, the metric data, the unique identifier, and the identifier string of blocks 102-116 would respectively become a first set of executable code, first metric data (also referred to as "parent metric data"), a first unique identifier (also referred to as a "parent identifier"), and a first identifier string (also referred to as a "parent identifier string"). In such cases, method 100 might further comprise, prior to initiating a callout to a second set of executable code, passing the unique identifier from the executing instance of the first set of executable code to the measurement function (block 118); creating, with the measurement function, a second unique identifier (also referred to as a "child identifier"), the second unique identifier being associated with execution of the second set of executable code and with the first unique identifier (block 120); associating the second unique identifier (or child identifier) with the first unique identifier (or parent identifier) (block 122); collecting, with the measurement function, metric data (referred to as "child metric data") about execution of the second set of executable code (block 124); storing, with the measurement function, second metric data (or child metric data) in the database (block 126); associating, in the database, the second metric data (or child metric data) with the second unique identifier (or child identifier) (block 128); returning, with the measurement function, a second identifier string (or child identifier string) to the executing instance of the first set of executable code, the second identifier string (or child identifier string) corresponding to the second unique identifier (or child identifier) (block 130); initiating a callout to the second set of executable code (i.e., calling the child) (block 132); passing the second identifier string (or child identifier string) to the measurement function (block 134); and adding a child stop time to the stored metric data (block 136).

As shown in FIG. 1 (with the dashed line arrow connecting from block 132 to block 102), at block 132, "calling the child" might cause the process of method 100 to return to block 102 to re-iterate for a child process (i.e., the second set of executable code). Method 100 might further comprise at least determining that the second set of executable code should be instrumented to measure performance of the second set of executable code (in a repeat of block 104 with the second set of executable code); invoking, with an executing instance of the second set of executable code, the measurement function, based at least in part on a determination that the second set of executable code should be instrumented (in a repeat of block 106 with the second set of executable code); collecting, with the measurement function, additional second metric data about execution of the second set of executable code (in a repeat of block 110 with the second set of executable code); storing, with the measurement function, the additional second metric data in the database (in a repeat of block 112 with the second set of executable code); and associating, in the database, the additional second metric data with the second unique identifier (in a repeat of block 122 with the second set of executable code). Other processes between blocks 102 and 132 may also be repeated in this manner, as appropriate or as desired. In some embodiments, the second set of executable code might execute in a different database than the first set of executable code. Alternatively, the second set of executable code might execute outside of any database. According to some embodiments, the first identifier string might comprise an execution chain identifier and wherein the second identifier string might also comprise the execution chain identifier.

Based on a determination that a callout is not to be made (or that a further callout is not to be made), method 100 might further comprise passing the identifier string (e.g., parent identifier string) to the measurement function (block 138) and adding a parent stop time to the stored metric data (block 140). In some embodiments, method 100 might further comprise performing rollback or roll-back operation (optional block 142; shown with dash and long-dash lines in FIG. 1), which may be performed only when necessary and is not part of the normal process of method 100. Even if a rollback operation is performed, it has no effect on the metrics storage process of stop times being generated.

Merely by way of example, in some aspects, the measurement function might employ autonomous transactions to store the metric data and stop time. In the case that a database management system does not support autonomous transactions, the measurement function might simulate an autonomous transaction to store the metric data and stop time, as described in detail below with respect to FIG. 3.

Figure 2:
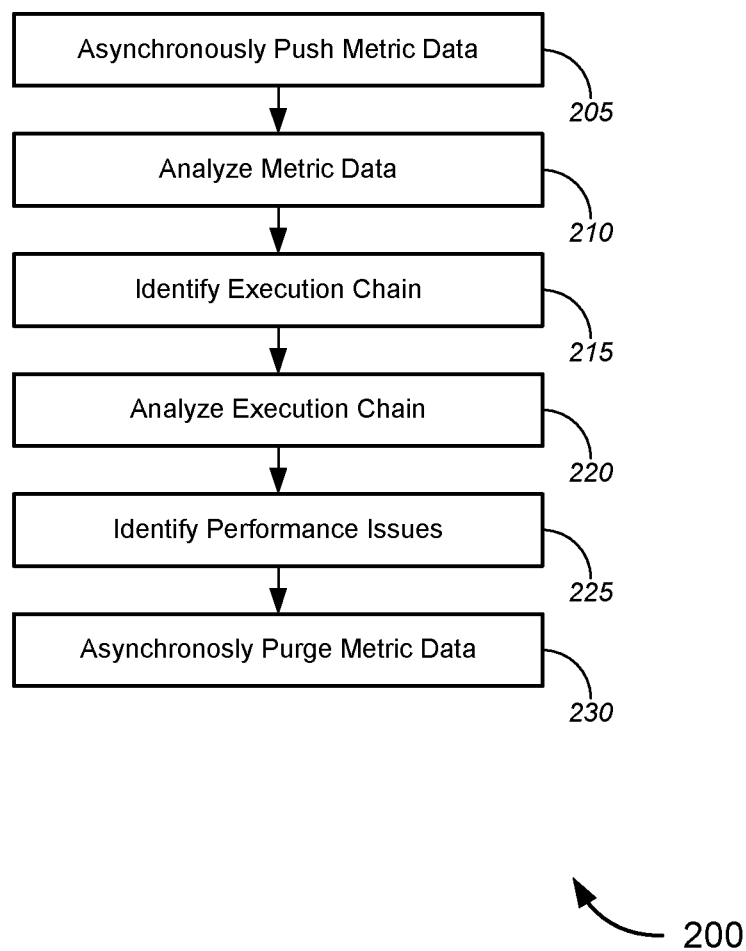
FIG. 2 is a block diagram depicting a method for asynchronously pushing or purging metric data, in accordance with various embodiments.
Figure 3:
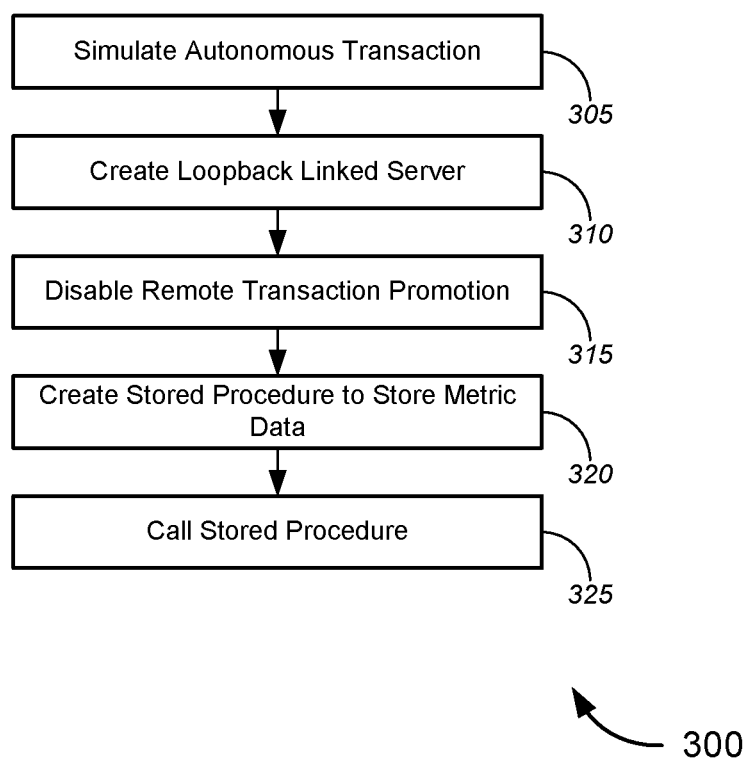
FIG. 3 is a block diagram depicting a method for simulating an autonomous transaction, in accordance with various embodiments.

FIGS. 2 and 3 are block diagrams depicting various methods for instrumenting and/or tracking code-module execution within a database(s), in accordance with various embodiments. FIG. 2 depicts a method 200 for asynchronously pushing or purging metric data, in accordance with various embodiments, while FIG. 3 depicts a method 300 for simulating an autonomous transaction, in accordance with various embodiments.

In the embodiment of FIG. 2, method 200 might comprise asynchronously pushing metric data (block 205). In some cases, the method 200 might also comprise associated unique identifier to a repository server for further analysis (not shown in FIG. 2). According to some embodiments, method 200 might also comprise analyzing the metric data and associated unique identifier in the repository server (block 210), in some cases, to identify an execution chain involving the executing instance of the set of executable code (block 215). In some instances, the execution chain might comprise executing instances of multiple sets of executable code, each set comprising different executable code. In some cases, at least some of the multiple sets of executable code might execute outside of the database. Method 200, in some instances, might further comprise analyzing the execution chain (block 220), in some cases, to identify performance issues relating to execution of at least some of the multiple sets of executable code (block 225). In some embodiments, method 200 might further comprise, at block 230, asynchronously purging the metric data from the dedicated table. In some instances, the metric data might be purged without regard to a success or failure in pushing the metric data to the repository server. In this manner, the method ensures that the metric data is collected and pushed (either periodically and/or asynchronously) to a repository server for further analysis and reporting (e.g., via a database job, an external job, a Java-based agent, and/or the like), and, regardless of the run or failure state of this job (or the APIs writing the metric data), "expired" data (whether processed or not) can be purged (and generally ensured to be purged), thereby keeping the metric data footprint small on the database itself.

Turning to the embodiment of FIG. 3, method 300 might comprise, at block 305, simulating an autonomous transaction. In some embodiments, simulating an autonomous transaction might comprise creating a loopback linked server (block 310), disabling remote transaction promotion in the loopback linked server (block 315), creating a stored procedure to store the metric data (and in some cases, a stop time as well) (block 320), and calling the stored procedure (block 325).

According to some embodiments, simulating an autonomous transaction might further comprise autonomously determining whether the database management system ("DBMS") is in an auto-commit mode and calling the stored procedure with or without using the loopback linked server, which is described in detail below with respect to FIG. 4. Herein, "auto-commit mode" might refer to a process in which a DBMS automatically commits the transaction. In some embodiments, autonomously determining whether the database management system is in an auto-commit mode might comprise determining whether implicit transactions are enabled in the DBMS and, if so, how many, as described in detail below with respect to FIG. 5.

Figure 4:
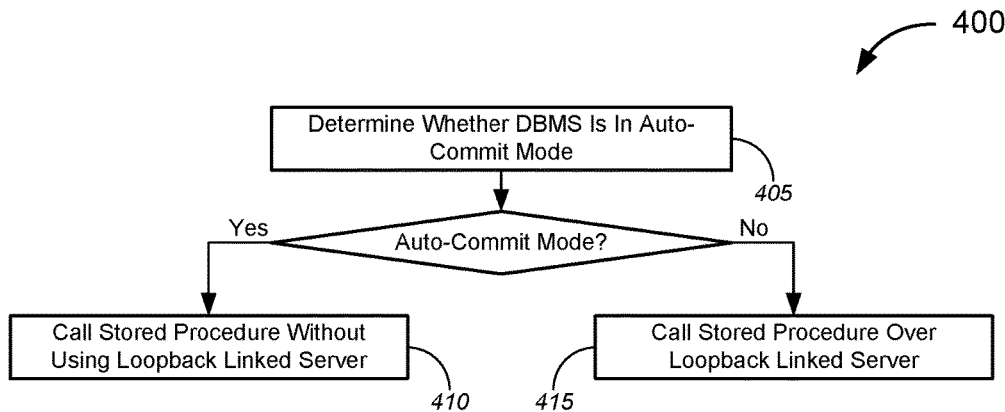
FIG. 4 is a process flow diagram illustrating a method for determining whether to use a loopback linked server based on whether a database management system ("DBMS") is in auto-commit mode, in accordance with various embodiments.

FIG. 4 is a process flow diagram illustrating a method 400 for determining whether to use a loopback linked server based on whether a database management system ("DBMS") is in auto-commit mode, in accordance with various embodiments. With reference to FIG. 4, method 400, at block 405 might comprise (autonomously) determining whether a DBMS is in auto-commit mode. If it is determined that the DBMS is in auto-commit mode, then method 400 proceeds to block 410. At block 410, method 400 comprises calling a stored procedure(s) without using a loopback linked server, or the like (i.e., by performing a direct insertion into a table, or the like).

On the other hand, if it is determined that the DBMS is not in auto-commit mode, then method 400 proceeds to block 415. At block 415, method 400 comprises calling a stored procedure(s) over a loopback linked server.

Figure 5:
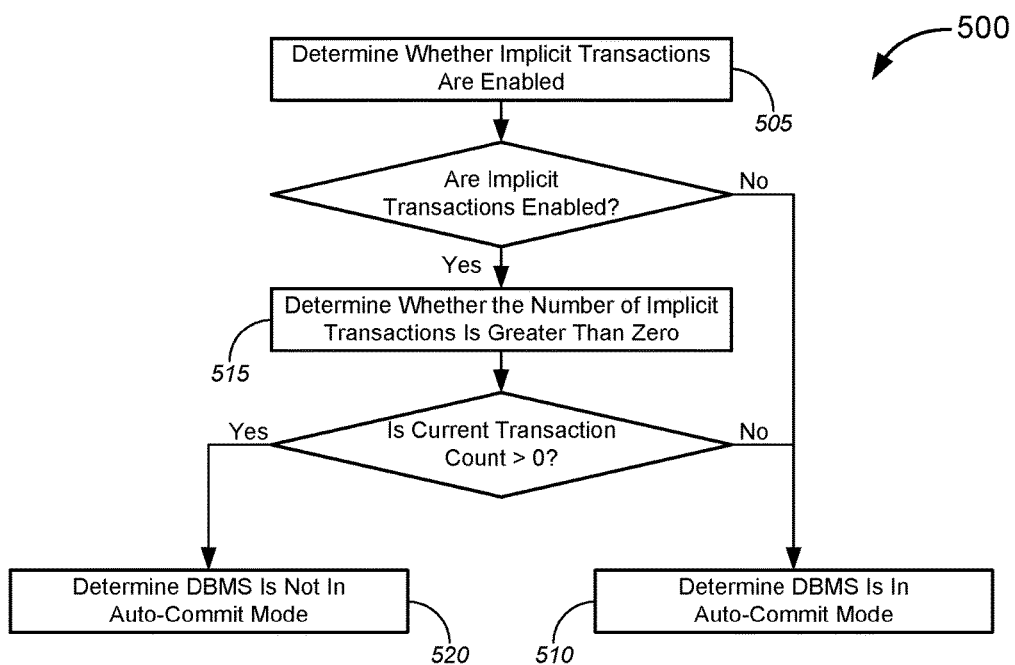
FIG. 5 is a process flow diagram illustrating a method for determining whether a DBMS is in auto-commit mode, in accordance with various embodiments.

FIG. 5 is a process flow diagram illustrating a method 500 for determining whether a DBMS is in auto-commit mode, in accordance with various embodiments. In the embodiment of FIG. 5, method 500 might comprise determining whether implicit transactions are enabled in the DBMS (block 505). If implicit transactions are determined not to be enabled, method 500 proceeds to block 510. At block 510, method 500 comprises determining that the DBMS is in auto-commit mode.

On the other hand, if implicit transactions are determined to be enabled, method 500 proceeds to block 515. At block 515, method 500 comprises determining whether the number of current implicit transactions (or a current transaction count) in the DBMS is greater than zero. If it is determined that the number of current implicit transactions (or the current transaction count) in the DBMS is not greater than zero, then method 500 proceeds to block 510, where it is determined that the DBMS is in an auto-commit mode. However, if it is determined that the number of current implicit transactions (or the current transaction count) in the DBMS is greater than zero, then method 500 proceeds to block 520. At block 520, method 500 comprises determining that the DBMS is not in an auto-commit mode.

Exemplary System and Hardware Implementation

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system, as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system that is or can be used to implement the functionalities as described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, and/or the like); one or more input devices 615, which can include, without limitation, a mouse, a keyboard and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

As noted above, a set of embodiments comprises methods and systems for instrumenting and/or tracking code-module execution within a database(s). FIG. 7 illustrates a schematic diagram of a system 700 that can be used in accordance with one set of embodiments. The system 700 can include one or more user computers, user devices, or customer devices 705. A user computer, user device, or customer device 705 (hereinafter, "user computer 705" or "client 705") can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer 705 can also have any of a variety of applications, including one or more applications configured to perform methods provided by various embodiments (as described above, for example), as well as one or more office applications, database client and/or server applications, and/or web browser applications. Alternatively, a user computer 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with three user computers 705*a*-705*c*, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715*a* and 715*b* (collectively, "server computers 715"). Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer 705 and/or another server 715. In some embodiments, an application server can perform one or more of the processes for instrumenting and/or tracking code-module execution within a database(s), or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). Herein, as described above, a "database" might refer collectively to a database and a database management system ("DBMS"), which can include a relational DBMS ("RDBMS") or other forms of DBMS, and the like. The location of each of the databases 720 is discretionary: merely by way of example, a database 720a might reside on a storage medium local to (and/or resident in) a server 715a (and/or a user computer 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for measuring database code-module performance and reliability, the method comprising:

receiving, by a computer in a database management system, a call to a set of executable code within a database managed by the database management system;

determining, by the computer in the database management system, that the set of executable code should be instrumented to measure performance of the set of executable code;

invoking, by a computer with an executing instance of the set of executable code in the database management system, a measurement function, based at least in part on a determination that the set of executable code should be instrumented;

collecting, by a computer with the measurement function, metric data about execution of the set of executable code, the metric data including a start time of the executing instance of the set of executable code;

storing, by the computer with the measurement function, the metric data in a dedicated table in the database in a memory, the dedicated table being separate from any tables on which the executing instance of the set of executable code operates;

associating, by the computer in the database management system, a unique identifier with the executing instance of the set of executable code and the metric data;

returning, by the computer with the measurement function, an identifier string to the executing instance of the set of executable code, the identifier string corresponding to the unique identifier;

passing, by the computer with the executing instance of the set of executable code, the identifier string to the measurement function at completion of execution of the set of executable code;

adding, by the computer with the measurement function, a stop time to the metric data in the database, based on receipt of the identifier string from the executing instance of the set of executable code; and performing, by the computer in the database management system, a roll-back operation in the database to revert transactions performed by the executing instance of the set of executable code, wherein the metric data persists in the dedicated table even after the roll-back operation has been performed.

2. The method of claim 1, further comprising: asynchronously pushing the metric data and associated unique identifier to a repository server for further analysis.

3. The method of claim 2, further comprising: analyzing the metric data and associated unique identifier in the repository server to identify an execution chain involving the executing instance of the set of executable code.

4. The method of claim 3, wherein the execution chain comprises executing instances of multiple sets of executable code, each set comprising different executable code.

5. The method of claim 4, wherein at least some of the multiple sets of executable code executes outside of the database.

6. The method of claim 4, further comprising: analyzing the execution chain to identify performance issues relating to execution of at least some of the multiple sets of executable code.

7. The method of claim 2, further comprising: asynchronously purging the metric data from the dedicated table.

8. The method of claim 7, wherein the metric data is purged without regard to a success or failure in pushing the metric data to the repository server.

9. The method of claim 1, wherein the measurement function employs autonomous transactions to store the metric data and stop time.

10. The method of claim 1, wherein the database management system does not support autonomous transactions, and wherein the measurement function simulates an autonomous transaction to store the metric data and stop time.

11. The method of claim 10, wherein simulating an autonomous transaction comprises: creating a loopback linked server; disabling remote transaction promotion in the loopback linked server; creating a stored procedure to store the metric data and stop time; and calling the stored procedure.

12. The method of claim 11, wherein simulating an autonomous transaction further comprises: autonomously determining whether the database management system is in an auto-commit mode; if the database management system is in an auto-commit mode, calling the stored procedure without using the loopback linked server; and if the database management system is not in an auto-commit mode, calling the stored procedure over the loopback linked server.

13. The method of claim 12, wherein autonomously determining whether the database management system is in an auto-commit mode comprises: determining whether implicit transactions are enabled in the database management system; determining whether a current transaction count in the database management system is greater than zero; and based on a determination that implicit transactions are not enabled and the current transaction count is not greater than zero, determining that the database management system is in an auto-commit mode.

14. The method of claim 1, wherein the set of executable code is a first set of executable code, the metric data is first metric data, the unique identifier is a first unique identifier, and the identifier string is a first identifier string, the method further comprising: prior to initiating a callout to a second set of executable code, passing the unique identifier from the executing instance of the first set of executable code to the measurement function; creating, with the measurement function, a second unique identifier, the second unique identifier being associated with execution of the second set of executable code and with the first unique identifier; storing, with the measurement function, second metric data in the database; associating, in the database, the second metric data with the second unique identifier; returning, with the measurement function, a second identifier string to the executing instance of the first set of executable code, the second identifier string corresponding to the second unique identifier; upon completion of execution of the second set of executable code, passing, with the executing instance of the first set of executable code, the second identifier string to the measurement function; and storing, with the measurement function, a second stop time with the second metric data in the database, based on receipt of the second identifier string from the executing instance of the first set of executable code.

15. The method of claim 14, further comprising: initiating, with the executing instance of the first set of executable code, the callout to the second set of executable code; determining that the second set of executable code should be instrumented to measure performance of the second set of executable code; invoking, with an executing instance of the second set of executable code, the measurement function, based at least in part on a determination that the second set of executable code should be instrumented; collecting, with the measurement function, additional second metric data about execution of the second set of executable code; storing, with the measurement function, the additional second metric data in the database; and associating, in the database, the additional second metric data with the second unique identifier.

16. The method of claim 14, wherein the second set of executable code executes in a different database than the first set of executable code.

17. The method of claim 14, wherein the second set of executable code executes outside of any database.

18. The method of claim 14, wherein the first identifier string comprises an execution chain identifier and wherein the second identifier string also comprises the execution chain identifier.

19. The method of claim 1, wherein the identifier string comprises the unique identifier.

20. The method of claim 1, wherein the identifier string comprises application or browser session information.

21. The method of claim 1, wherein the metric data comprises performance timings.

22. The method of claim 1, wherein the metric data comprises execution parameters.

23. The method of claim 1, wherein the metric data comprises success or failure information.

24. The method of claim 1, wherein the executable code comprises a database trigger.

25. The method of claim 1, wherein the executable code comprises a stored procedure or function.

26. The method of claim 1, wherein the executable code comprises a database job.

27. The method of claim 1, wherein the executable code comprises an external script.

28. The method of claim 1, wherein the call to the set of executable code comprises at least one parameter associated with the management function, and wherein determining that the set of executable code should be instrumented comprises parsing the at least one parameter.

29. An apparatus, comprising: a non-transitory computer readable medium having encoded thereon a set of instructions executable by one or more computers to cause the apparatus to:
- receive, in a database management system, a call to a set of executable code within a database managed by the database management system;
- determine, in the database management system, that the set of executable code should be instrumented to measure performance of the set of executable code;
- invoke, with an executing instance of the set of executable code in the database management system, a measurement function, based at least in part a determination that the set of executable code should be instrumented;
- collect, with the measurement function, metric data about execution of the set of executable code, the metric data including a start time of the executing instance of the set of executable code;
- store, with the measurement function, the metric data in a dedicated table in the database in a memory, the dedicated table being separate from any tables on which the executing instance of the set of executable code operates;
- associate, in the database, a unique identifier with the executing instance of the set of executable code and the metric data;
- return, with the measurement function, an identifier string to the executing instance of the set of executable code, the identifier string corresponding to the unique identifier;
- pass, with the executing instance of the set of executable code, the identifier string to the measurement function at completion of execution of the set of executable code;
- add, with the measurement function, a stop time to the metric data in the database, based on receipt of the identifier string from the executing instance of the set of executable code; and
- perform a roll-back operation in the database to revert transactions performed by the executing instance of the set of executable code, wherein the metric data persists in the dedicated table even after the roll-back operation has been performed.

30. A computer system, comprising:
- one or more processors; and a non-transitory computer readable medium in communication with the one or more processors, the non-transitory computer readable medium having encoded thereon a set of instructions executable by the one or more processors to cause the computer system to:
- receive, in a database management system, a call to a set of executable code within a database managed by the database management system;
- determine, in the database management system, that the set of executable code should be instrumented to measure performance of the set of executable code;
- invoke, with an executing instance of the set of executable code in the database management system, a measurement function, based at least in part a determination that the set of executable code should be instrumented;
- collect, with the measurement function, metric data about execution of the set of executable code, the metric data including a start time of the executing instance of the set of executable code;
- store, with the measurement function, the metric data in a dedicated table in the database in a memory, the dedicated table being separate from any tables on which the executing instance of the set of executable code operates;
- associate, in the database, a unique identifier with the executing instance of the set of executable code and the metric data;
- return, with the measurement function, an identifier string to the executing instance of the set of executable code, the identifier string corresponding to the unique identifier;
- pass, with the executing instance of the set of executable code, the identifier string to the measurement function at completion of execution of the set of executable code;
- add, with the measurement function, a stop time to the metric data in the database, based on receipt of the identifier string from the executing instance of the set of executable code; and
- perform a roll-back operation in the database to revert transactions performed by the executing instance of the set of executable code, wherein the metric data persists in the dedicated table even after the roll-back operation has been performed.

* * * * *